United States Patent [19]

Finlayson et al.

[11] 4,105,578
[45] Aug. 8, 1978

[54] ORGANOPHILIC CLAY HAVING ENHANCED DISPERSIBILITY

[75] Inventors: Claude Malcolm Finlayson; John W. Jordan, both of Houston, Tex.

[73] Assignee: N L Industries, Inc., New York, N.Y.

[21] Appl. No.: 771,099

[22] Filed: Feb. 23, 1977

Related U.S. Application Data

[63] Continuation-in-part of Ser. No. 749,323, Dec. 10, 1976, which is a continuation-in-part of Ser. No. 573,967, May 2, 1975, abandoned.

[51] Int. Cl.$^2$ .............................................. B01J 13/00
[52] U.S. Cl. ................................ 252/316; 252/8.5 P; 252/28; 260/448 C
[58] Field of Search ................. 252/316, 309 B, 8.5 P, 252/28; 260/448 C

[56] References Cited

U.S. PATENT DOCUMENTS

| | | | |
|---|---|---|---|
| 2,531,427 | 11/1950 | Hauser | 252/316 X |
| 2,859,234 | 11/1958 | Clem | 252/28 X |
| 2,966,506 | 12/1960 | Jordan | 260/448 C |
| 3,133,072 | 5/1964 | Shibe, Jr. et al. | 252/316 X |
| 3,537,994 | 11/1970 | House | 252/28 X |

*Primary Examiner*—Richard D. Lovering
*Attorney, Agent, or Firm*—G. M. Nath; R. F. House

[57] ABSTRACT

An organophilic clay gellant having enhanced dispersibility in organic systems is prepared from the reaction product of a smectite-type clay having a cation exchange capacity of at least 0.75 milliequivalents per gram and from 1.00 to less than 1.20 milliequivalents per gram of clay of a methyl benzyl dialkyl ammonium compound, wherein the compound contains 20 to 35% alkyl groups having 16 carbon atoms and 60 to 75% alkyl groups having 18 carbon atoms.

5 Claims, No Drawings

ORGANOPHILIC CLAY HAVING ENHANCED DISPERSIBILITY

CROSS REFERENCE TO RELATED APPLICATIONS

This application is a continuation-in-part of copending application Ser. No. 749,323 filed Dec. 10, 1976, which is a continuation-in-part of application Ser. No. 573,967 filed May 2, 1975, the latter now abandoned.

This invention relates to organophilic organic-clay complexes which are dispersible in organic liquids to form a gel therein. Depending on the composition of the gel, such gels may be useful as lubricating greases, oil base muds, oil base packer fluids, paint-varnish-lacquer removers, paints, foundry molding sand binders and the like.

It is well known that organic ompounds which contain a cation will react under favorable conditions by ion-exchange with clays which contain a negative layer-lattice and exchangeable cations to form organophilic organic-clay products. If the organic cation contains at least one alkyl group containing at least 10 carbon atoms, then such organoclays have the property of swelling in certain organic liquids. See for Example U.S. Pat. No. 2,531,427 and U.S. Pat. No. 2,966,506, both incorporated herein by reference, and the book "Clay Mineralogy", 2nd Edition, 1968 by Ralph E. Grim (McGraw-Hill Book Co., Inc.), particularly Chapter 10, Clay-Mineral-Organic Reactions; pp. 356–368-Ionic Reactions, Smectite; and pp. 392–401-Organophilic Clay-Mineral Complexes.

Since the commercial introduction of these organoclays in the early 1950's (trademarked BENTONE), it has become well known to gain the maximum gelling (thickening) efficiency from these organoclays by adding a low molecular weight polar organic material to the composition. Such polar organic materials have been variously called dispersants, dispersion aids, solvating agents, dispersion agents and the like. See for example the following U.S. Pat. Nos.: O'Halloran 2,677,661; McCarthy et al. 2,704,276; Stratton 2,833,720; Stratton 2,879,229; Stansfield et al. 3,294,683.

An excellent review of the variables which affect the gelation of lubricating oils by organoclays to form greases is given by C. J. Boner is his book "Manufacture and Applications of LUBRICATING GREASES", 1954 (Reinhold Publishing Corp.), pp. 724–748-Clay Base Thickeners. Articles which disclose the use of organophilic clay gellants and polar organic dispersants as viscosifiers in organic systems are the following:

(1) "Some Aspects Of BENTONE Greases", R. E. Fariss, NLGI Spokesman, January, 1957, pp. 10–16; (2) "A Modified Clay Thickener for Lubricating Fluids", R. E. Fariss, NLGl Spokesman, February, 1960, pp. 432–437; (3) "A Modified Clay Thickener For Corrosion Resistant Greases", R. F. House, NLGI Spokesman, April, 1966, pp. 11–17; (4) "The Gelation Of Hydrocarbons by Montmorillonite Organic Complexes", W. T. Granquist and James L. McAtee, Jr., J. Colloid Science 18, 409–420 (1963); (5) "Flow Properties Of Dispersions Of An Organo-Montmorillonite In Organic Media", J. V. Kennedy and W. T. Granquist, NLGI Spokesman, August, 1965, pp. 138–145; (6) "Some Fundamental Aspects Of The Permeability Of Organo-Montmorillonite Greases", J. L. McAtee, Jr. and Liang-koa Chen, NLGI Spokesman, June, 1968, pp. 89–95; (7) "Fundamental Aspects Of The Permeability And Gel Strength Of Inorganic Thickened Greases", J. L. McAtee, Jr. and J. P. Freeman, NLGI Spokesman, September, 1968, pp. 200–205; (8) "Study Of Dispersants In The Preparation Of Inorganic Thickened Greases", J. L. McAtee, Jr., NLGI Spokesman, May, 1969, pp. 52–60; (9) "Extent of Dispersion of an Organo-Clay Complex in Oil-An Infrared Method", F. W. Schaefer, A. C. Wright and W. T. Granquist, NLGI Spokesman, March, 1971, pp. 418–423.

It is disclosed in U.S. Pat. No. 3,753,906 that water is a dispersant when used in a heated grease preparation process. U.S. Pat. No. 3,654,171, however, discloses that water is not a dispersant in grease preparation processes conducted at a temperature ranging from ambient to about 220° F. (104.44° C). These polar materials may also affect properties other than the viscosity or gel strength of the organic gels, such as mechanical stability, thixotropy, and storage stability.

The most efficient and accepted polar materials for use as dispersants have been found to be low molecular weight alcohols and ketones, particularly methanol and acetone. These dispersants, however, have very low flash points and require the use of flameproof apparatus. Higher boiling, high flask point dispersants may be used but these are less efficient and often produce gels having poor secondary properties such as mechanical stability or storage stability.

U.S. Pat. No. 3,537,994 discloses the use of organophilic clays prepared from methyl benzyl dihexadecyl ammonium compounds as gellants for lubricating greases. All of the examples in this patent disclose the use of a polar organic dispersant for the organophilic clay in the preparation of the greases.

Accordingly, there is a need for an organophilic clay gellant which is easy to disperse in organic systems and which requires no dispersant, other than perhaps minor quantities of water, for gelling organic systems.

An organophilic clay gellant having enhanced dispersibility in organic systems has been unexpectedly discovered comprising the reaction product of a methyl benzyl dialkyl ammonium compound, wherein the compound contains 20 to 35% alkyl groups having 16 carbon atoms, and 60 to 75% alkyl groups having 18 carbon atoms and a smectite-type clay having a cation exchange capacity of at least 75 milliequivalents per 100 grams of said clay, and wherein the amount of said ammonium compound is from 100 to 120 milliequivalents per 100 grams of said clay, 100% active clay basis.

The clays used to prepare the organoclay thickeners of this invention are smectite-type clays which have a cation exchange capacity of at least 75 milliequivalents per 100 grams of clay. Particularly desirable types of clay are the naturally occurring Wyoming variety of swelling bentonite and like clays, and hectorite, a swelling magnesium-lithium silicate clay.

The clays, especially the bentonite type clays, are preferably converted to the sodium form if they are not already in this form. This can conveniently be done by preparing an aqueous clay slurry and passing the slurry through a bed of cation exchange resin in the sodium form. Alternatively the clay can be mixed with water and a soluble sodium compound such as sodium carbonate, sodium hydroxide, etc., and shearing the mixture such as with a pugmill or extruder.

Smectite-type clays prepared synthetically by either a pneumatolytic or, preferably, a hydrothermal synthesis process can also be used to prepare these novel organic-clay complexes. Representative of such clays are the following:

Montmorillonite $[(Al_{4-x}Mg_x) Si_8O_{20}(OH)_{4-f}F_f] x R^+$ where $0.55 \leq x \leq 1.10, f \leq 4$ and R is selected from the group consisting of Na, Li, NH$_4$, and mixtures thereof:

Bentonite $[(Al_{4-x}Mg_x) (Si_{8-y}Al_y)O_{20}(OH)_{4-f}F_f] (x+y) R^+$ where $0 < x < 1.10, 0 < y < 1.10, 0.55 \leq (x+y) \leq 1.10, f \leq 4$ and R is selected from the group consisting of Na, Li, NH$_4$, and mixtures thereof;

Beidellite $[(Al_{4+y}) (Si_{8-x-y}Al_{x+y})O_{20}(OH)_{4-f}F_f] x R^+$ where $0.55 \leq x \leq 1.10, 0 \leq y \leq 0.44, f \leq 4$ and R is selected from the group consisting of Na, Li, NH$_4$ and mixtures thereof;

Hectorite $[(Mg_{6-x}Li_x) Si_8O_{20}(OH)_{4-f}F_f] x R^+$ where $0.57 \leq x \leq 1.15, f \leq 4$ and R is selected from the group consisting of Na, Li, NH$_4$, and mixtures thereof;

Saponite $[(Mg_{6-y}Al_y) (Si_{8-x-y}Al_{x+y})O_{20}(OH)_{4-f}F_f] x R^+$ where $0.58 \leq x \leq 1.18, 0 \leq y \leq 0.66, f \leq 4$ and $R^+$ is selected from the group consisting of Na, Li, NH$_4$, and mixtures thereof;

Stevensite $[(Mg_{6-x}) Si_8O_{20}(OH)_{4-f}F_f] 2 x R^+$ where $0.28 \leq x \leq 0.57, f \leq 4$ and R is selected from the group consisting of Na, Li, NH$_4$ and mixtures thereof.

These clays may be synthesized hydrothermally by forming an aqueous reaction mixture in the form of a slurry containg mixed hydrous oxides or hydroxides of the desired metals with or without, as the case may be, sodium (or alternate exchangeable cation or mixture thereof) fluoride in the proportions defined by the above formulas and the preselected values of $x$, $y$ and $f$ for the particular synthetic smectite desired. The slurry is then placed in an autoclave and heated under autogenous pressure to a temperature within the range of approximately 100° to 325° C., preferably 275° to 300° C., for a sufficient period of time to form the desired product. Formulation times of 3 to 48 hours are typical at 300° C., depending on the particular smectite being synthesized, and the optimum time can readily be determined by pilot trials. Representative hydrothermal processes for preparing synthetic smectites are described in the following U.S. Pat. Nos., incorporated herein by reference: Granquist 3,252,757; Neumann 3,586,478; Orlemann 3,666,407; Neumann 3,671,190; Hickson 3,844,978; Hickson 3,844,979; Granquist 3,852,405; Granquist 3,855,147.

The cation exchange capacity of the smectite clay can be determined by the well-known ammonium acetate method.

The organic compounds useful in the practice of this invention are quaternary ammonium salts containing one methyl radical, one benzyl radical, and a mixture of alkyl radicals having from 14 to 20 carbon atoms, wherein 20 to 35% have 16 carbon atoms and 60 to 75% have 18 carbon atoms, 100% basis. The salt anion is preferably selected from the group consisting of chloride and bromide, and mixtures thereof, and is more preferably chloride, although other anions such as acetate, hydroxide, nitrite, etc., may be present in the quaternary ammonium salt to neutralize the quaternary ammonium cation. The methyl benzyl dialkyl ammonium salt may be represented by the formula:

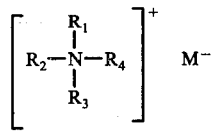

where $R_1 = CH_3$, $R_2 = C_6H_5CH_2$, $R_3$ and $R_4$ are alkyl groups containing a mixture of 14 to 20 carbon atoms wherein 20 to 35% have 16 carbon atoms and 60 to 75% have 18 carbon atoms, based on 100%; and where $M^-$ is preferably selected from the group consisting of $Cl^-$, $Br^-$, $NO_2^-$, $OH^-$, $C_2H_3O_2^-$, and mixtures thereof.

The preferred quaternary amine for use in the practice of this invention is methyl benzyl dihydrogenated tallow ammonium chloride. Commercially prepared hydrogenated tallow typically analyzes 2.0% $C_{14}$, 0.5% $C_{15}$, 29.0% $C_{16}$, 1.5% $C_{17}$, 66.0% $C_{18}$, and 1.0% $C_{20}$ alkyl radicals.

The alkyl radicals may be derived friom other natural oils including various vegetable oils, such as corn oil, soybean oil, cottonseed oil, castor oil, and the like, and various animal oils or fats. The alkyl radicals may be petrochemically derived such as from alpha olefins.

Many processes are known to prepare methyl benzyl dialkyl ammonium salts. Generally one skilled in the art would prepare a dialkyl secondary amine, for example, by the hydrogenation of nitriles, see U.S. Pat. No. 2,355,356; form the methyl dialkyl tertiary amine by reductive alkylation using formaldehyde as the source of methyl radical, see Shapiro et. al. U.S. Pat. No. 3,136,819; and thereafter form the quaternary amine halide by adding benzyl chloride or benzyl bromide to the tertiary amine, see Shapiro et al. U.S. Pat. No. 2,775,617.

The organophilic clays of this invention can be prepared by admixing the clay, quaternary ammonium compound and water together, preferably at a temperature within the range from 100° F. (38° C.) to 180° F. (82° C), more preferably 140° F. (60° C.) to 170° F. (77° C.) for a period of time sufficient for the organic compound to coat the clay particles, followed by filtering, washing, drying and grinding. In using the organophilic clays in emulsions, the drying and grinding steps may be eliminated. When admixing the clay, quaternary ammonium compound and water together in such concentrations that a slurry is not formed, then the filtration and washing steps can be eliminated.

Preferably the clay is dispersed in water at a concentration from about 3% to 7%, the slurry optionally centrifuged to remove non-clay impurities which constitute about 10% to about 50% of the starting clay composition, the slurry agitated and heated to a temperature in the range from 140° F. (60° C.) to 170° F. (77° C.) the quaternary amine salt added in the desired milliequivalent ratio, preferably as a liquid in isopropanol or dispersed in water, and the agitation continued to effect the reaction.

The amount of the methyl benzyl dialkyl ammonium salt added to the clay for purposes of this invention must be sufficient to impart to the organophilic clay the enhanced dispersion characteristics desired. The milliequivalent ratio is defined as the number of milliequivalents of the organic compound in the organoclay per 100 grams of clay, 100% active clay basis. The organophilic clays of this invention must have a milliequivalent ratio from 100 to 120. At lower milliequivalent ratios the organophilic clays produced are not effective gellants even though they may be good gellants when dispersed in a conventional manner with polar organic dispersants, etc. At higher milliequivalent ratios the organophilic clays are poor gellants. However, it will be recognized that the preferred milliequivalent within the range from 100 to 120, will vary depending on the characteristics of the organic system to be gelled by the organophilic clay.

A simple convenient test has been devised to illustrate the enhanced dispersion characteristics of the organophilic clays utilized in this invention and the results obtained in utilizing the composition of this invention. The test is conducted by mixing the organophilic clay with a conventionally refined low VI oil at a concentration of 4.5% by weight for 0.5 minutes using a Fisher Scientific Co. DYNA-MIX™ mixer operating at 1800 rpm. The viscosity of the oil-gellant mixture is then obtained. Longer mixing times may be undertaken. Thereafter 0.12% water is added to the mixture and the mixing is continued. The viscosity of the mixture is periodically determined, generally after 6–9 minutes. A Brookfield RVT Viscometer is used to obtain the viscosity although any suitable viscometer can be used. Under these low shear conditions in the absence of a polar organic dispersion aid the much greater dispersibility of the organophilic clays of this invention as compared to previously known organophilic clays can be readily demonstrated. Generally, the organophilic clays prepared from approximately 100% active clay, (containing essentially no impurities) will produce a gel having a 10% rpm Brookfield viscosity of at least 20,000 centipoises when dispersed at a concentration of 4.5% in a hydrocarbon oil having a viscosity index less than about 20 with a mixer operating at 1800 rpm for 6 minutes in the presence of 0.1–0.5% added water.

The following examples illustrate the composition of this invention and the benefits afforded through the utilization thereof but are not to be construed as limiting the invention except as discussed herein.

The smectite clays used are hectorite and Wyoming bentonite. The hectorite clay was slurried in water and centrifuged to remove essentially all of the non-clay impurities. The Wyoming bentonite clay was slurried in water, centrifuged to remove essentially all of the non-clay impurities, and ion-exchanged to the sodium form by passing the slurry through a bed of cation exchange resin in the sodium form. Several samples of methyl benzyl dihydrogenated tallow ammonium chloride supplied by ENENCO, Inc. were used to prepare the organoclays in the examples. The molecular weight of these samples ranged from 619 to 644, and the percent activity in isopropanol varied from 60% to 81.5%.

The conventionally refined oil and the solvent refined oils had the following properties:

|  | Conventionally Refined | Solvent Refined |
|---|---|---|
| Gravity, ° API at 60 F. | 20 | 30.4 |
| Viscosity, SUS at 100 F. | 500 | 400 |
| Viscosity, SUS at 210 F. | 53 | 58 |
| Viscosity Index | 12 | 98 |
| Index of Refraction | 1.5085 | 1.4811 |
| Flash Point, ° F. | 390 | 460 |
| Pour Point, ° F. | −5 | 5 |

EXAMPLE 1

The organophilic clays listed in Table A were prepared by heating the clay slurry to a temperature within the range from 150° F. (66° C.) to 170° F. (77° C.), adding while stirring the clay slurry, the indicated amount of the indicated quaternary ammonium chloride which had been previously melted for convenience in handling, and continuing the stirring for approximately 45 minutes, followed by filtering, washing, drying at 140° F. (60° C.), and grinding.

These organophilic clays were evaluated in the conventionally refined oil in the ease of dispersion test described which dramatically indicates the improved ease of dispersion of these thickeners as compared to similar organophilic clay thickeners. The data in Table A indicates the sharp increase in the ease of dispersion of organophilic clays prepared from methyl benzyl dihydrogenated tallow ammonium chloride and the smectite-type clays when the amount of this quaternary ammonium compound was in the range of 100 to 120 milliequivalents per 100 grams of clay. The data also illustrates the much superior dispersion characteristics of the inventive organophilic clays as compared with organophilic clays prepared from somewhat similar but different quaternary ammonium compounds.

EXAMPLE 2

Various types of the organophilic clay gellants prepared in Example 1 were evaluated as grease thickeners at a concentration of 6% by weight in the conventionally refined oil in the presence of 0.1% and 0.3% water. The greases were prepared by mixing the gellant, oil and water together for 30 minutes using a drill press equipped with pitched sweep blades rotating at 450 rpm. The resulting batch was then milled through a Tri-Homo disperser with a rotor to stator clearance of 0.001 inch. The ASTM penetrations of the greases, after setting overnight, were obtained after working the greases 60 and 10,000 strokes in an ASTM motorized grease worker assembly. The data obtained are given in Table B. These gellants were also evaluated in a conventional heated grease preparation processes utilizing 4% by weight acetone as a polar organic dispersant for the gellant. The greases were prepared by mixing the gellant, oil and acetone together for 30 minutes, heating to 250° F. (121° C.) with continued mixing to drive off the acetone, cooling to 180° F. (82° C.) and adding 0.1% water with continued mixing, and milling as above. The data obtained for these greases, which are not an illustration of this invention, are compared with the data for the greases in Table B since these greases have the same compostion.

The data indicates that the organophilic clays containing an amount of methyl benzyl dihydrogenated tallow ammonium cation in excess of 100 milliequivalent per 100 grams of clay were very efficient thickeners for this oil at ambient temperatures using only a small modicum of water as the dispersant. The data also indicates that the organophilic clays having milliequivalent ratios in excess of 100 disperse readily in the absence of a polar organic dispersant to produce greases having a penetration ("yield" or viscosity) which is equivalent to that obtained for the greases prepared with the dispersant, whereas at lower milliequivalent ratios the organophilic clays produce greases which are definitely inferior to the greases prepared with the dispersant.

EXAMPLE 3

The organophilic clay of Examples 1 and 2 prepared from hectorite reacted with 108 milliequivalents/100 grams of clay of methyl benzyl dihydrogenated tallow ammonium chloride was evaluated as a grease gellant in the same manner as in Example 2 except that the concentration of water was varied from 0% to 0.4%. The ASTM penetrations after working the greases 60 and 10,000 strokes were as follows:

0% water — 259,259; 0.1% water — 236, 264; 0.2% water — 230, 275; 0.3% water — 214, 250; 1 0.4% water — 243, 275.

EXAMPLE 4

A hectorite clay containing 106.8 milliequivalents methyl benzyl dihydrogenated tallow ammonium cation and a bentonite clay containing 102.6 milliequivalents methyl benzyl dihydrogenated tallow ammonium cation were evaluated as gellants at a concentration of 5% in the conventionally refined oil in the presence of 0.2% water. These organophilic clays were evaluated in a similar manner in the presence of 2% acetone as a dispersant for the organophilic clays. The greases were prepared by mixing the gellant, oil and either water or acetone together for 30 minutes using the drill press as in Example 2, and milling the pre-gels obtained as in Example 2. The greases were evaluated as in Example 2. The data obtained are given in Table C.

The data indicates that the greases prepared containing only 0.2% water had a much lower penetration (higher grease "yield" or viscosity) than the greases containing the polar organic dispersant prepared by the prior art process.

EXAMPLE 5

Various organophilic clays were prepared using the procedures given in Example 1 from sodium bentonite and the indicated milliequivalent ratios of methyl benzyl dihydrogenated tallow ammonium chloride. These organophilic clays were evaluated as thickeners for the conventionally refined oil and the solvent refined oil using the procedures given in Example 2. The data obtained are given in Table D.

The data indicates that the preferred concentration of the quaternary ammonium compound is from 100 milliequivalent to 120 milliequivalents per 100 grams of clay.

EXAMPLE 6

The 102.6 milliequivalent ratio bentonite clay thickener of Example 1 was evaluated as a thickener/suspending agent in an invert emulsion (water-in-oil) drilling fluid at a concentration of 4 pounds per barrel (42 gallons). The drilling fluid had the following composition: 154 parts diesel oil, 129 parts water, 68 parts calcium chloride, 8 parts DURATONE HT$^{TM}$, fluid loss control additive, 15 parts INVERMUL$^{TM}$ emulsifier, and 2 Part E-Z MUL$^{TM}$ emulsifier. Standard rheology data were obtained on the drilling fluids after mixing with the organophilic clay for 15 minutes with a multimixer. The results given in Table E indicate that this organophilic clay is an excellent thickener for invert emulsion drilling fluids.

The examples indicate the remarkable results achieved utilizing the process of this invention, namely, that the viscosity of liquid organic systems is efficiently increased with an organophilic clay gellant in the absence of a polar organic dispersant for the gellant. Indeed, it is preferred that the viscosity of the organic system obtained by the process of this invention is at least equal to the viscosity which would be obtained if the organic system contained an effective dispersing amount of a polar organic dispersant for the gellant. This can be achieved for any particular organic system by adjusting the milliequivalent ratio of the organophilic clay gellant to the optimum value for that system within the range of 100 to 120.

The invention being thus described, it will be obvious that the same may be varied in many ways, such variations are not to be regarded as a departure from the spirit and scope of the invention, and all such modifications are intended to be included within the scope of the following claims.

TABLE A

| Organophilic Clay | | | 4.5% Organophilic Clay 10 rpm Brookfield Viscosity, cp. | | |
|---|---|---|---|---|---|
| | | | 0% Water | 0.12% Water | |
| Quaternary Ammonium Chloride | Clay | ME Ratio | 0.5 Minutes | 6 Minutes | 9 Minutes |
| Methyl benzyl dihydrogenated tallow | Hectorite | 87.5 | 480 | —(2) | 1,000 |
| Methyl benzyl dihydrogenated tallow | Hectorite | 92.4 | 480 | — | 2,000 |
| Methyl benzyl dihydrogenated tallow | Hectorite | 97.2 | 560 | — | 9,000 |
| Methyl benzyl dihydrogenated tallow | Hectorite | 99.1 | 560 | — | 11,200 |
| Methyl benzyl dihydrogenated tallow | Hectorite | 99.7 | — | 11,200 | — |
| Methyl benzyl dihydrogenated tallow | Hectorite | 103.8 | 7,000 | 48,400 | 58,400 |
| Methyl benzyl dihydrogenated tallow | Hectorite | 104.3 | — | 35,200 | 50,000 |
| Methyl benzyl dihydrogenated tallow | Hectorite | 106.5 | 6,720 | 48,000 | — |
| Methyl benzyl dihydrogenated tallow | Hectorite | 108.0 | 2,040 | 49,600 | 64,400 |
| Methyl benzyl dihydrogenated tallow | Hectorite | 110.5 | 1,040 | 33,000 | 46,800 |
| Methyl benzyl dihydrogenated tallow | Hectorite | 112.9 | 890 | 44,000 | 67,600 |
| Methyl benzyl dihydrogenated tallow | Hectorite | 115.0 | 3,400 | 33,600 | 34,800 |
| Methyl benzyl dihydrogenated tallow | Hectorite | 117.9 | — | 21,000 | — |
| Methyl benzyl dihydrogenated tallow | Hectorite | 124.9 | — | 13,00 | — |
| Methyl benzyl dihydrogenated tallow | Bentonite | 91.5 | 400 | 400 | — |
| Methyl benzyl dihydrogenated tallow | Bentonite | 96.9 | — | 3,200 | — |
| Methyl benzyl dihydrogenated tallow | Bentonite | 102.6 | 2,880 | 36,800 | 44,000 |
| Methyl benzyl dihydrogenated tallow | Bentonite | 106.0 | 9,280 | 51,200 | 50,000 |
| Methyl benzyl dihydrogenated tallow | Bentonite | 111.0 | 20,000 | 30,400 | 25,000 |
| Methyl benzyl dihydrogenated tallow | Bentonite | 114.4 | — | 15,500 | — |
| Methyl benzyl dihydrogenated tallow | Bentonite | 120.2 | — | 14,600 | — |
| Methyl benzyl dihydrogenated tallow | Bentonite | 123.6 | — | 6,800 | — |
| Dimethyl dihydrogenated tallow | Hectorite | 95.2 | — | 3,400 | — |
| Dimethyl dihydrogenated tallow | Hectorite | 102.9 | — | 3,400 | — |
| Dimethyl dihydrogenated tallow | Hectorite | 108.8 | 480 | 12,500 | — |
| Dimethyl dihydrogenated tallow | Hectorite | 117.0 | 440 | 440 | — |
| Methyl trihydrogenated tallow | Hectorite | 95.8 | — | 4,800 | — |
| Methyl trihydrogenated tallow | Hectorite | 101.9 | — | 4,400 | — |
| Methyl trihydrogenated tallow | Hectorite | 108.5 | 640 | 3,320 | — |
| Methyl trihydrogenated tallow | Hectorite | 118.5 | — | 7,400 | — |

TABLE A-continued

| Organophilic Clay | | | 4.5% Organophilic Clay 10 rpm Brookfield Viscosity, cp. | | |
|---|---|---|---|---|---|
| | | ME | 0% Water | 0.12% Water | |
| Quaternary Ammonium Chloride | Clay | Ratio | 0.5 Minutes | 6 Minutes | 9 Minutes |
| Benzyl trihydrogenated tallow | Hectorite | 95.5 | — | 5,000 | — |
| Benzyl trihydrogenated tallow | Hectorite | 101.4 | — | 4,800 | — |
| Benzyl trihydrogenated tallow | Hectorite | 107.9 | 1,480 | 4,000 | — |
| Benzyl trihydrogenated tallow | Hectorite | 119.9 | — | 5,600 | — |
| Dimethyl benzyl hydrogenated tallow | Hectorite | 117 | — | — | 560 |
| Dimethyl benzyl hydrogenated tallow | Bentonite | 96.6 | — | 400 | — |
| Dimethyl benzyl hydrogenated tallow | Bentonite | 101.9 | — | 200 | — |
| Dimethyl benzyl hydrogenated tallow | Bentonite | 111.1 | — | 400 | — |
| Dimethyl benzyl hydrogenated tallow | Bentonite | 120.5 | — | 400 | — |
| Methyl benzyl dihydrogenated tallow | (1) | 111.0 | 8,800 | 41,600 | 42,800 |

(1) 1:1 weight ratio of hectorite and bentonite
(2) — indicates the data was not obtained

TABLE B

| Organophilic Clay | | | Process of This Invention ASTM Penetrations, mm × 10(2) | | | | Prior Art Process ASTM Penetrations, mm × 10 | |
|---|---|---|---|---|---|---|---|---|
| Quaternary Ammonium Chloride | Clay | ME Ratio | 0.1% Water | | 0.3% Water | | 0.1% Water | |
| | | | 60x | 10,000x | 60x | 10,000x | 60x | 10,000x |
| MB2HT(1) | Hectorite | 87.5 | 440+ | — | 402 | 433 | 345 | 367 |
| MB2HT | Hectorite | 92.4 | 384 | 417 | 384 | 422 | 329 | 354 |
| MB2HT | Hectorite | 97.2 | 334 | 350 | 320 | 363 | 278 | 304 |
| MB2HT | Hectorite | 99.1 | 309 | 343 | 299 | 345 | 275 | 300 |
| MB2HT | Hectorite | 103.8 | 252 | 285 | 245 | 294 | 245 | 267 |
| MB2HT | Hectorite | 108.0 | 236 | 264 | 214 | 250 | 245 | 265 |
| MB2HT | Hectorite | 112.9 | 262 | 301 | 262 | 321 | 292 | 318 |

(1) Methyl benzyl dihydrogenated tallow
(2) Greases "too thin" to measure have penetrations greater than 440.

TABLE C

| 5% Gellant in a Conventionally Refined Oil | | | | | | |
|---|---|---|---|---|---|---|
| Quaternary Ammonium Cation(1) | Clay | ME Ratio | % Water | % Acetone | ASTM Pene., mm × 10 | |
| | | | | | 60x | 10,000x |
| MB2HT | Hectorite | 106.8 | 0.2 | 0 | 285 | 321 |
| MB2HT | Hectorite | 106.8 | 0 | 2.0 | 332 | 368 |
| MB2HT | Bentonite | 102.6 | 0.2 | 0 | 300 | 341 |
| MB2HT | Bentonite | 102.6 | 0 | 2.0 | 328 | 362 |

(1) Methyl benzyl dihydrogenated tallow

TABLE D

| Oil | ME Ratio | % Water | ASTM Penetrations, mm × 10 | |
|---|---|---|---|---|
| | | | 60x | 10,000x |
| Conventionally refined | 87.9 | 0 | 373 | 390 |
| Conventionally refined | 96.7 | 0 | 344 | 373 |
| Conventionally refined | 100.3 | 0 | 299 | 345 |
| Conventionally refined | 105.9 | 0 | 275 | 336 |
| Conventionally refined | 114.5 | 0 | 345 | 382 |
| Conventionally refined | 120.3 | 0 | 410 | 415 |
| Solvent refined | 87.9 | 0.3 | 440+ | — |
| Solvent refined | 96.7 | 0.3 | 440+ | — |
| Solvent refined | 100.3 | 0.3 | 358 | 402 |
| Solvent refined | 105.9 | 0.3 | 305 | 342 |
| Solvent refined | 114.5 | 0.3 | 304 | 374 |
| Solvent refined | 120.3 | 0.3 | 347 | 390 |

TABLE E

| Drilling Fluid Rheological Characteristics | | | | | | |
|---|---|---|---|---|---|---|
| Organo Bentonite Thickener | Fann Viscosity | | Apparent Viscosity cp. | Yield Point lb/100 ft² | Gel Strength lb/100 ft² | |
| | 600 rpm | 300 rpm | | | 10 sec. | 10 min |
| Example 1, 102.6 ME | 160 | 110 | 80.0 | 60 | 37 | 44 |
| None | 79 | 43 | 39.5 | 7 | 3 | 3 |

What is claimed is:

1. An organophilic clay gellant having enhanced dispersibility in organic systems and capable of increasing the viscosity of a liquid organic system without the addition of a polar organic dispersant, comprising the reaction product of a methyl benzyl dialkyl ammonium compound, wherein the compound contains 20 to 35% alkyl groups having 16 carbon atoms and 60 to 75% alkyl groups having 18 carbon atoms, and a smectite-type clay having a cation exchange capacity of at least 75 milliequivalents per 100 grams of said clay, and wherein the amount of said ammonium compound is from 100 to 120 milliequivalents per 100 grams of said clay, 100% active clay basis.

2. The composition of claim 1 wherein the smectite-type clay is selected from the group consisting of hectorite and sodium bentonite.

3. The composition of claim 1 wherein the methyl benzyl dialkyl ammonium compound is methyl benzyl dihydrogenated tallow ammonium chloride.

4. The composition of claim 1 wherein the smectite-type clay contains from about 10% to about 50% non-clay impurities.

5. An organophilic clay gellant having enhanced dispersibility in organic systems comprising the reaction product of an ammonium compound having the formula:

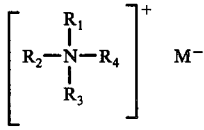

wherein $R_1 = CH_3$, $R_2 = C_6H_5CH_2$, $R_3$ and $R_4$ are alkyl groups containing a mixture of 14 to 20 carbon atoms wherein 20 to 35% have 16 carbon atoms and 60 to 75% have 18 carbon atoms, based on 100% and where $M^-$ is selected from the group consisting of $Cl^-$, $Br^-$, $NO_2^-$, $OH^-$, and $C_2H_3O_2^-$, and a smectite-type clay selected from the group consisting of hectorite and sodium bentonite, and wherein the amount of said ammonium compound is from 100 to 120 milliequivalents per 100 grams of said clay, 100% active clay basis.

* * * * *